US006724161B2

(12) United States Patent
Ueda et al.

(10) Patent No.: US 6,724,161 B2
(45) Date of Patent: Apr. 20, 2004

(54) IMAGE FORMING APPARATUS AND CONTROL METHOD OF MOTOR THEREIN

(75) Inventors: Tadayuki Ueda, Tokyo (JP); Hiroyuki Maruyama, Tokyo (JP); Kenji Izumiya, Tokyo (JP); Ryuji Okutomi, Tokyo (JP); Eiji Nishikawa, Tokyo (JP); Satoshi Ogata, Tokyo (JP); Shinobu Kishi, Tokyo (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 10/060,518

(22) Filed: Jan. 30, 2002

(65) Prior Publication Data

US 2002/0149329 A1 Oct. 17, 2002

(30) Foreign Application Priority Data

Feb. 6, 2001 (JP) ....................................... 2001-029412

(51) Int. Cl.[7] ............................... H02P 5/46; H02P 7/74
(52) U.S. Cl. .............................. 318/34; 318/53; 318/67
(58) Field of Search ........................... 318/34–113, 255, 318/560, 685, 696; 399/396, 167

(56) References Cited

U.S. PATENT DOCUMENTS 5,583,410 A * 12/1996 Jacobson et al. ........... 318/696
5,837,408 A * 11/1998 Parker et al. ................. 430/42
6,281,645 B1 * 8/2001 Matsukawa ................. 318/112
6,390,464 B1 * 5/2002 Gutierrez et al. ........... 271/184
6,400,913 B1 * 6/2002 de Jong et al. ............... 399/66
6,411,008 B1 * 6/2002 Otsubo et al. ......... 310/316.01
6,453,139 B2 * 9/2002 Sasame et al. .............. 399/167
6,459,225 B1 * 10/2002 Maruyama .................. 318/560
2002/0085241 A1 * 7/2002 Izumiya et al. ............. 358/410
2002/0108052 A1 * 8/2002 Maruyama .................. 713/193
2003/0016965 A1 * 1/2003 Matsumoto ................. 399/167

* cited by examiner

*Primary Examiner*—Robert Nappi
*Assistant Examiner*—Patrick L Miller
(74) *Attorney, Agent, or Firm*—Frishauf, Holtz, Goodman & Chick, P.C.

(57) ABSTRACT

The invention concerns an improvement of a drive system of a color image forming apparatus. The color image-forming apparatus includes a plurality of image-forming elements; a plurality of first driving motors, each of which corresponds to each of the image-forming elements, to drive the plurality of image-forming elements; an intermediate transfer element that is disposed opposite the plurality of image-forming elements; a second driving motor to drive the intermediate transfer element; and a controlling section to control the plurality of first driving motors and the second driving motor. In the color image-forming apparatus, the controlling section controls the plurality of first driving motors and the second driving motor independently of each other, so that a first peripheral speed of each of the image-forming elements coincides with a second peripheral speed of the intermediate transfer element.

22 Claims, 5 Drawing Sheets

FIG. 5 ( a )
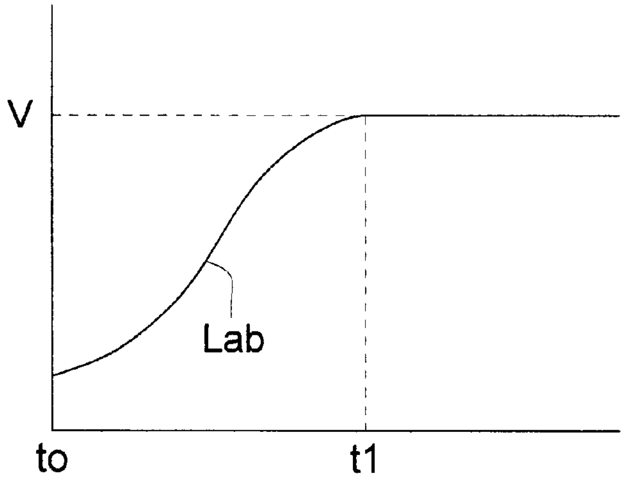
FIG. 5 ( b )
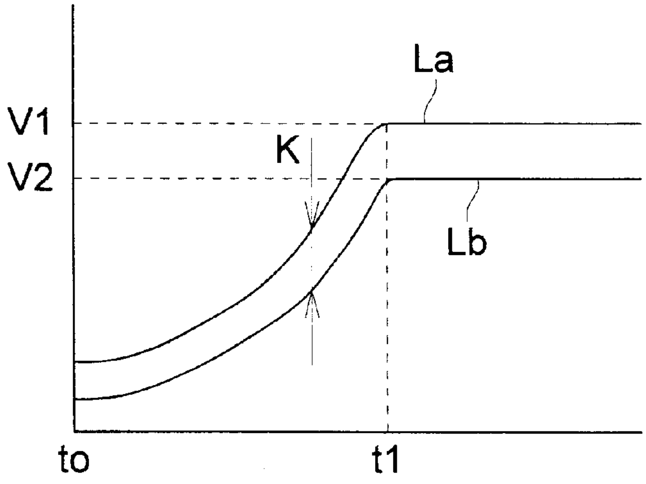

IMAGE FORMING APPARATUS AND CONTROL METHOD OF MOTOR THEREIN

BACKGROUND OF THE INVENTION

The present invention relates to an image forming apparatus, and particularly to an improvement of a drive system of a color image forming apparatus.

By using a plurality of image forming elements and an intermediate transfer element, in a color image forming apparatus in which a single color toner image formed on the plurality of image forming elements is transferred onto the intermediate transfer element and one full color image is formed, the drive control of the plurality of image forming elements, the control of time of image formation onto the each of image forming elements and the drive control of the intermediate transfer element are very important. When the consistency is insufficient between the respective controls, or there is a difference of peripheral speed between each of image forming elements or between the image forming element and intermediate transfer element, or the time of toner image formation to each of image forming elements is out of the regular time, a color doubling or image disturbance is generated. Therefore, the high accurate control technology is used for each control.

Relating to the start stop control of each image forming element and the start stop control of the intermediate transfer element, the time control is conducted, and for the image forming element and the intermediate transfer element which are in contact with each other, the time control which starts simultaneously and stops simultaneously is conducted.

However, when the control by only the time is conducted, it has been seen that there are following problems.

It is inevitable that, between the image forming element and the intermediate transfer element, the difference of the rising characteristic and the falling characteristic is generated due to the difference of masses of themselves or the difference of inertia of these drive systems. Accordingly, the velocity change at the rising time of the image forming element and the velocity change at the rising time of the intermediate transfer element are different, and these velocity changes at the falling time are different.

Therefore, even when the image forming element drive motor and the intermediate transfer element drive motor are simultaneously turned on, the image forming element and the intermediate transfer element reach a predetermined steady state velocity through respectively different changes of velocity. Such different rising characteristics are shown in FIG. 1. It is defined that the image forming element shows the rising characteristic by a curve A, and the intermediate transfer element has the rising characteristic shown by a curve B. Both are operated at the same steady state velocity V, and in an area a, the peripheral speed of the image forming element is larger than the peripheral speed of the intermediate transfer element, and in an area b, the peripheral speed of the intermediate transfer element is larger than the peripheral speed of the image forming element. Because the image forming element and the intermediate transfer element are in contact with each other, when there is the difference between such the rising characteristics, in the area a, the intermediate transfer element and its drive system act as a load on the image forming element drive motor, and in the area b, the image forming element and its drive system act as a load on the intermediate transfer element dive motor.

Such the reverse rotation phenomenon between the peripheral speed of the image forming element and the peripheral speed of the intermediate transfer element or the phenomenon that one side peripheral speed is largely higher than the peripheral speed of the other one, is generated, and an undesirable phenomenon that an excessive load torque is burdened on the drive motor is generated. The phenomenon shown in FIG. 1 is generated not only at the start time, but also at the time of a steady state operation and stop.

Accordingly, when the design work of the drive system of the image forming element and the drive system of the intermediate transfer element is conducted, it is necessary that the power of the drive motor and the drive current of the motor are set considering not only original loads but also the above described excessive loads.

Therefore, the motor having the excessive power becomes necessary, and the excessive electric power is necessary, resulting in an increase of cost and increase of the power consumption.

SUMMARY OF THE INVENTION

To overcome the abovementioned drawbacks in conventional color image forming apparatus employing the intermediate transfer element, it is an object of the present invention to provide a color image-forming apparatus whose cost is low and power consumption is small.

Accordingly, to overcome the cited shortcomings, the abovementioned object of the present invention can be attained by image-forming apparatus and methods described as follow.

(1) An image-forming apparatus, comprising: a plurality of image-forming elements; a plurality of first driving motors, each of which corresponds to each of the image-forming elements, to drive the plurality of image-forming elements; an intermediate transfer element that is disposed opposite the plurality of image-forming elements; a second driving motor to drive the intermediate transfer element; and a controlling section to control the plurality of first driving motors and the second driving motor; wherein the controlling section controls the plurality of first driving motors and the second driving motor independently of each other, so that a first peripheral speed of each of the image-forming elements coincides with a second peripheral speed of the intermediate transfer element.

(2) The image-forming apparatus of item 1, wherein the controlling section performs controlling actions at a rise time of both the plurality of first driving motors and the second driving motor.

(3) The image-forming apparatus of item 1, wherein the controlling section performs controlling actions at a steady-state operating time of both the plurality of first driving motors and the second driving motor.

(4) The image-forming apparatus of item 1, wherein the controlling section performs controlling actions at a rise time of both the plurality of first driving motors and the second driving motor, so that a moving distance of each of the image-forming elements coincides with that of the intermediate transfer element.

(5) The image-forming apparatus of item 1, wherein, when stopping the plurality of first driving motors and the second driving motor, the controlling section turns off the second driving motor preceding to turning off the plurality of first driving motors.

(6) The image-forming apparatus of item 1, wherein either a stepping motor or a DC motor is employed for both the plurality of first driving motors and the second driving motor.

(7) An image-forming apparatus, comprising: a plurality of image-forming elements; a plurality of first driving motors, each of which corresponds to each of the image-forming elements, to drive the plurality of image-forming elements; an intermediate transfer element that is disposed opposite the plurality of image-forming elements; a second driving motor to drive the intermediate transfer element; and a controlling section to control the plurality of first driving motors and the second driving motor; wherein the controlling section controls the plurality of first driving motors and the second driving motor independently of each other, so that a first peripheral speed of each of the image-forming elements is faster than a second peripheral speed of the intermediate transfer element by a predetermined value.

(8) The image-forming apparatus of item 7, wherein the controlling section performs controlling actions at a rise time of both the plurality of first driving motors and the second driving motor.

(9) The image-forming apparatus of item 7, wherein the controlling section performs controlling actions at a steady-state operating time of both the plurality of first driving motors and the second driving motor.

(10) The image-forming apparatus of item 7, wherein, when stopping the plurality of first driving motors and the second driving motor, the controlling section turns off the second driving motor preceding to turning off the plurality of first driving motors.

(11) The image-forming apparatus of item 7, wherein either a stepping motor or a DC motor is employed for both the plurality of first driving motors and the second driving motor.

(12) A method for controlling motors equipped in an image-forming apparatus, which includes a plurality of image-forming elements, a plurality of first driving motors to drive the plurality of image-forming elements, an intermediate transfer element disposed opposite the plurality of image-forming elements, and a second driving motor to drive the intermediate transfer element, comprising the step of: controlling the plurality of first driving motors and the second driving motor independently of each other, so that a first peripheral speed of each of the image-forming elements coincides with a second peripheral speed of the intermediate transfer element.

(13) The method of item 12, wherein the controlling step is performed at a rise time of both the plurality of first driving motors and the second driving motor.

(14) The method of item 12, wherein the controlling step is performed at a steady-state operating time of both the plurality of first driving motors and the second driving motor.

(15) The method of item 12, wherein the controlling step is performed at a rise time of both the plurality of first driving motors and the second driving motor, so that a moving distance of each of the image-forming elements coincides with that of the intermediate transfer element.

(16) The method of item 12, further comprising the step of: turning off the second driving motor preceding to turning off the plurality of first driving motors, when stopping the plurality of first driving motors and the second driving motor.

(17) The method of item 12, wherein either a stepping motor or a DC motor is employed for both the plurality of first driving motors and the second driving motor.

(18) A method for controlling motors equipped in an image-forming apparatus, which includes a plurality of image-forming elements, a plurality of first driving motors to drive the plurality of image-forming elements, an intermediate transfer element disposed opposite the plurality of image-forming elements, and a second driving motor to drive the intermediate transfer element, comprising the step of: controlling the plurality of first driving motors and the second driving motor independently of each other, so that a first peripheral speed of each of the image-forming elements is faster than a second peripheral speed of the intermediate transfer element by a predetermined value.

(19) The method of item 18, wherein the controlling step is performed at a rise time of both the plurality of first driving motors and the second driving motor.

(20) The method of item 18, wherein the controlling step is performed at a steady-state operating time of both the plurality of first driving motors and the second driving motor.

(21) The method of item 18, further comprising the step of: turning off the second driving motor preceding to turning off the plurality of first driving motors, when stopping the plurality of first driving motors and the second driving motor.

(22) The method of item 18, wherein either a stepping motor or a DC motor is employed for both the plurality of first driving motors and the second driving motor.

Further, to overcome the abovementioned problems, other image-forming apparatus and methods, embodied in the present invention, will be described as follow:

(23) An image forming apparatus having: a plurality of image forming elements; a plurality of image forming element drive motors which are provided corresponding to each of the plurality of image forming elements, and which drive each of the image forming elements; an intermediate transfer element provided opposed to the plurality of image forming elements; an intermediate transfer drive motor for driving the intermediate transfer element; and a control means for controlling the image forming element driving motors and the intermediate transfer element drive motor, the image forming apparatus is characterized in that the control means controls the image forming element drive motors and the intermediate transfer element drive motor by a method by which they can be independently controlled.

(24) An image forming apparatus according to item 23, wherein the control means conducts the control at the rise time of the image forming element drive motors and the intermediate transfer element drive motor so that the peripheral speed of the image forming element and the peripheral speed of the intermediate transfer element become the same.

(25) An image forming apparatus according to item 23, or 24, wherein the control means conducts the control at the steady state operation time of the image forming element drive motors and the intermediate transfer element drive motor so that the peripheral speed of the image forming element and the peripheral speed of the intermediate transfer element become the same.

(26) An image forming apparatus according to any one of items 23 to 25, wherein the control means conducts the control so that a movement distance of the image forming element and the movement distance of the intermediate transfer element at the rise time of the image forming element drive motors and the intermediate transfer drive motor become the same.

(27) An image forming apparatus according to item 23, wherein the control means controls the image forming element drive motors and the intermediate transfer element drive motor so that the peripheral speed of the intermediate transfer element is not higher than the peripheral speed of the image forming elements by a predetermined value.

(28) An image forming apparatus according to item 23, or 27, wherein the control means conducts the control at the rise time of the image forming element drive motors and the intermediate transfer element drive motor so that the peripheral speed of the intermediate transfer element is not higher than the peripheral speed of the image forming elements by a predetermined value.

(29) An image forming apparatus according to item 23, 27 or 28, wherein the control means conducts the control at the steady state operation time of the image forming element drive motors and the intermediate transfer element drive motor so that the peripheral speed of the intermediate transfer element is not higher than the peripheral speed of the image forming elements by a predetermined value.

(30) An image forming apparatus according to any one of items 23 to 29, wherein the control means turns off the intermediate transfer element drive motor not later than the image forming element drive motor at the stop time.

(31) An image forming apparatus according to any one of items 23 to 30, wherein a stepping motor or a DC motor is used as the image forming element drive motor and the intermediate transfer element drive motor.

(32) A control method of a motor in an image forming apparatus characterized in that the image forming element drive motor and the intermediate transfer element drive motor are controlled by a method by which they can be controlled independently of each other.

(33) A control method of a motor in an image forming apparatus according to item 32, wherein the image forming element drive motor and the intermediate transfer element drive motor are controlled so that the peripheral speed of the image forming element and the peripheral speed of the intermediate transfer element drive motor at the rise time are the same.

(34) A control method of a motor in an image forming apparatus according to either one of item 32 or 33, wherein the image forming element drive motor and the intermediate transfer element drive motor are controlled so that the peripheral speed of the image forming element and the peripheral speed of the intermediate transfer element drive motor at the steady state operation time are the same.

(35) A control method of a motor in an image forming apparatus according to any one of items 32 to 34, wherein the image forming element drive motor and the intermediate transfer element drive motor are controlled so that the movement distance of the image forming element and the movement distance of the intermediate transfer element at the rise time are the same.

(36) A control method of a motor in an image forming apparatus according to item 32, wherein the image forming element drive motor and the intermediate transfer element drive motor at the rise time are controlled so that the peripheral speed of the intermediate transfer element drive motor is not higher than the peripheral speed of the image forming element by a predetermined value.

(37) A control method of a motor in an image forming apparatus according to either one of item 32 or 36, wherein the image forming element drive motor and the intermediate transfer element drive motor at a steady state operation time are controlled so that the peripheral speed of the intermediate transfer element drive motor is not higher than the peripheral speed of the image forming element by a predetermined value.

(38) A control method of a motor in an image forming apparatus according to any one of items 32 to 37, wherein the intermediate transfer element drive motor is turned off not later than the image forming element drive motor at the stop time.

(39) A control method of a motor in an image forming apparatus according to any one of items 32 to 38, wherein a stepping motor or a DC motor is used as the image forming element drive motor and the intermediate transfer element drive motor.

BRIEF DESCRIPTION OF THE DRAWINGS

Other objects and advantages of the present invention will become apparent upon reading the following detailed description and upon reference to the drawings in which:

FIGS. 5(*a*) and 5(*b*) are graphs showing changes of peripheral speeds of the photoreceptor and the intermediate transfer element in the embodiment of the present invention.

DETAILED DESCRIPTION OF THE PREFERRED EMBODIMENT

Figure 2:
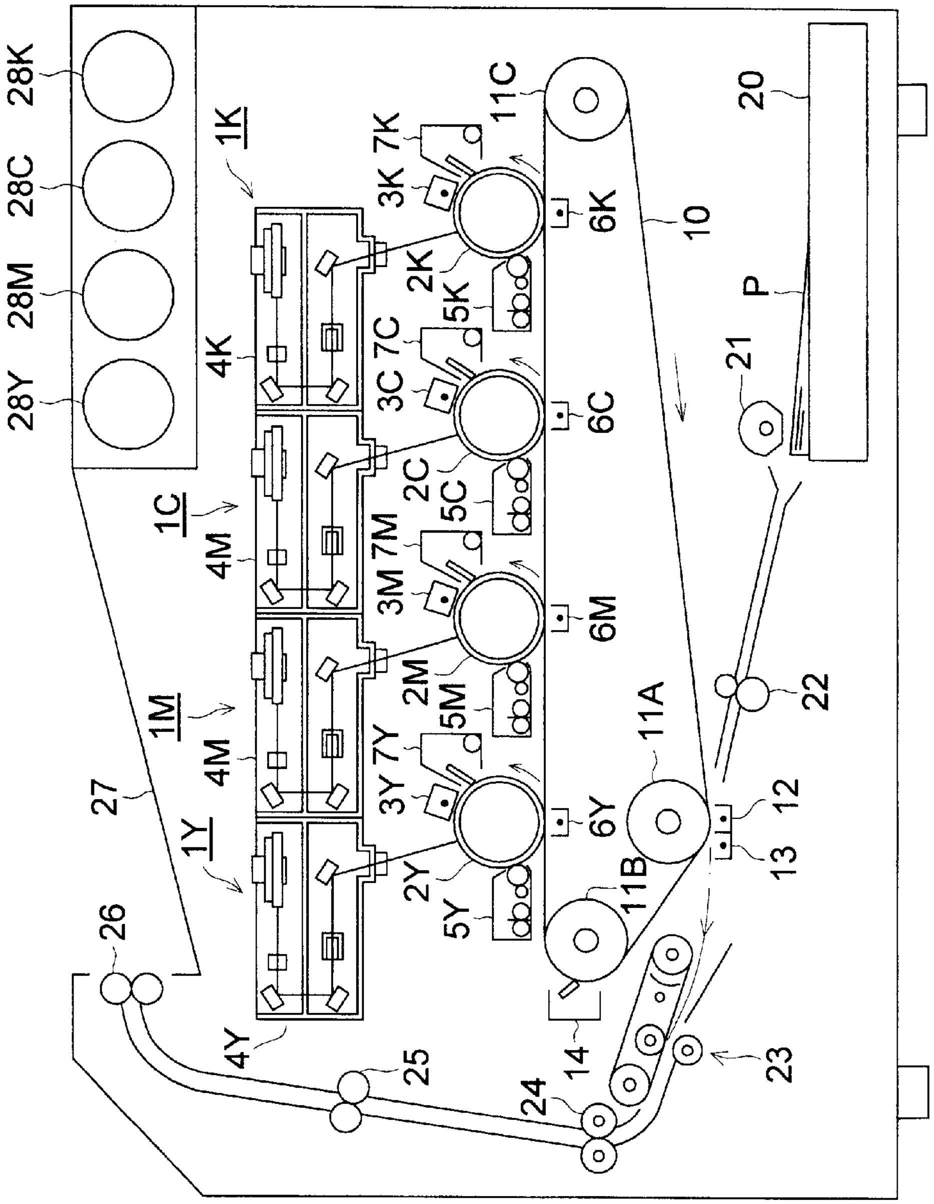
FIG. 2 is a view showing an overall structure of a color image forming apparatus according to the embodiment of the present invention.

Referring to FIG. 2, a color image forming apparatus according to the embodiment of the present invention will be described below. FIG. 2 shows a whole structure of the color image forming apparatus according to the embodiment of the present invention.

The color image forming apparatus shown in the drawing forms a full color toner image onto an intermediate transfer element 10 by a yellow image forming section 1Y forming a yellow toner image, a magenta image forming section 1M forming a magenta toner image, a cyan image forming section 1C forming a cyan toner image and a black image forming section 1K forming a black toner image, and the full color toner image is transferred onto a recording sheet P from the intermediate transfer element 10 and the full color toner image is formed on the recording sheet P.

The yellow image forming section 1Y is composed of a drum-like photoreceptor 2Y as an image forming element, and a scorotron charger, and has a charging apparatus 3Y to provide a uniform charging potential onto the photoreceptor 2Y, an exposure apparatus 4Y to dot-exposure the photoreceptor 2Y by a light beam from a laser light source, a developing apparatus 5Y to develop an electrostatic latent image formed by the charge and exposure on the photoreceptor 2Y and to form the yellow toner image, a transfer apparatus 6Y composed of the scorotron charger to transfer the toner image on the photoreceptor 2Y onto the intermediate transfer element 10, and a cleaning apparatus 7Y to clean the photoreceptor 2Y.

The magenta image forming section 1M has a photoreceptor 2M as the image forming element having a function which is the same as the above description in the yellow image forming element 1Y, charging apparatus 3M, exposure apparatus 4M, developing apparatus 5M, transfer apparatus 6M, and cleaning apparatus 7M, and the cyan image forming section 1C has a photoreceptor 2C as the image forming element having a function which is the same as the above description in the yellow image forming section 1Y, charging apparatus 3C, exposure apparatus 4C, developing apparatus 5C, transfer apparatus 6C, and cleaning apparatus 7C, and the black image forming section 1K has a photoreceptor 2K as the image forming element having a function which is the same as the above description in the yellow image forming section 1Y, charging apparatus 3K, exposure apparatus 4K, developing apparatus 5K, transfer apparatus 6K, and cleaning apparatus 7K.

The intermediate transfer element 10 is stretched over a drive roller 11A, driven roller 11B, and driven roller 11C, and is rotated in the arrowed direction. In the periphery of the intermediate transfer element 10, the yellow image forming section 1Y, magenta image forming section 1M, cyan image forming section 1C, black image forming section 1K, a transfer apparatus 12 composed of a corotron charger to transfer a toner image on the intermediate transfer element 10 onto the recording sheet P, separation apparatus 13 composed of corotron charger to separate the recording sheet P from the intermediate transfer element 10, and cleaning apparatus 14 to clean the intermediate transfer element 10, are arranged.

The recording sheet P is accommodated in a sheet feed cassette 20, and is conveyed by a sheet feed roller 21 from the sheet feed cassette 20, and by a register roller 22, the sheet is fed onto a position of the transfer apparatus 12 in timed relationship with the toner image formation on the intermediate transfer element 10. Numeral 23 is a fixing apparatus having a belt, which is a heat source, and pressure roller, and while the recording sheet P is conveyed, the toner image is fixed on the recording sheet P. The recording sheet P passed through the fixing apparatus 23 is delivered on a sheet delivery tray 27 through conveyance rollers 24, 25 and 26.

A 28Y, 28M, 28C, and 28K are toner containers to respectively accommodate a yellow toner, magenta toner, cyan toner, and black toner, and each of color toners is supplemented to the developing apparatus 5Y, 5M, 5C, and 5K to which each color toner corresponds, from these toner containers.

According to the arrowed rotation of the photoreceptor 2Y, the charge by the charger 3Y, exposure by the exposure apparatus 4Y, and development by the developing apparatus 5Y are conducted, and the yellow toner image is formed on the photoreceptor 2Y, and respectively, by the same charge, exposure, and development, the magenta toner image is formed on the photoreceptor 2M, and by the same charge, exposure, and development, the cyan toner image is formed on the photoreceptor 2C, and by the same charge, exposure, and development, the black toner image is formed on the photoreceptor 2K. The timing control is conducted so that these color toner images are superimposed on and transferred onto the intermediate transfer element 10, and a full color toner image is formed.

The full color toner image on the intermediate transfer element 10 is transferred onto the recording sheet P by the transfer apparatus 12. After the full color toner image is fixed on the recording sheet P by the fixing apparatus 23, the recording sheet P is delivered onto a sheet delivery tray 27.

The photoreceptors 2Y, 2M, 2C, and 2K are respectively cleaned by cleaning apparatus 7Y, 7M, 7C, and 7K after the transfer, and are in the condition that the next image formation can be conducted. The intermediate transfer element 10 is cleaned by the cleaning apparatus 14 after the full color toner image is transferred, and in the condition that the next image formation can be conducted. The toner consumed by the development is respectively supplemented from the toner containers 28Y, 28M, 28C, and 28K, to the corresponding developing apparatus 5Y, 5M, 5C, and 5K.

Figure 3:
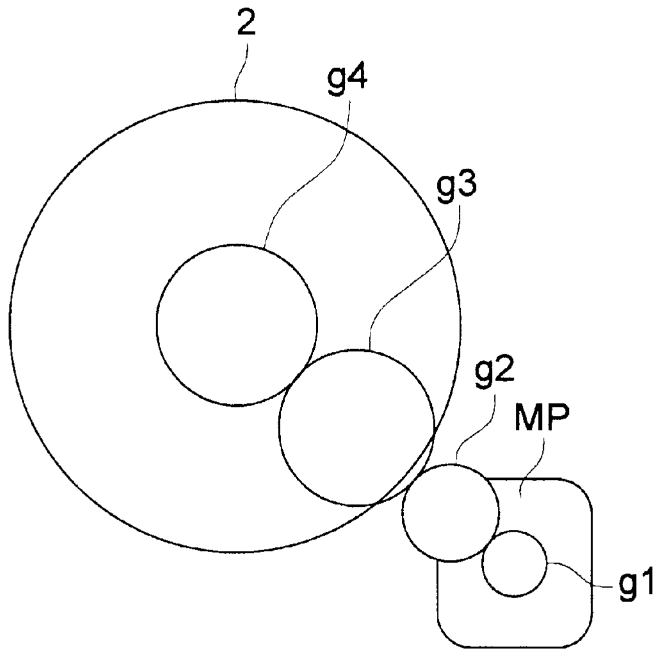
FIGS. 3(*a*) and 3(*b*) are views showing drive systems of a photoreceptor and the intermediate transfer element.
Figure 3:
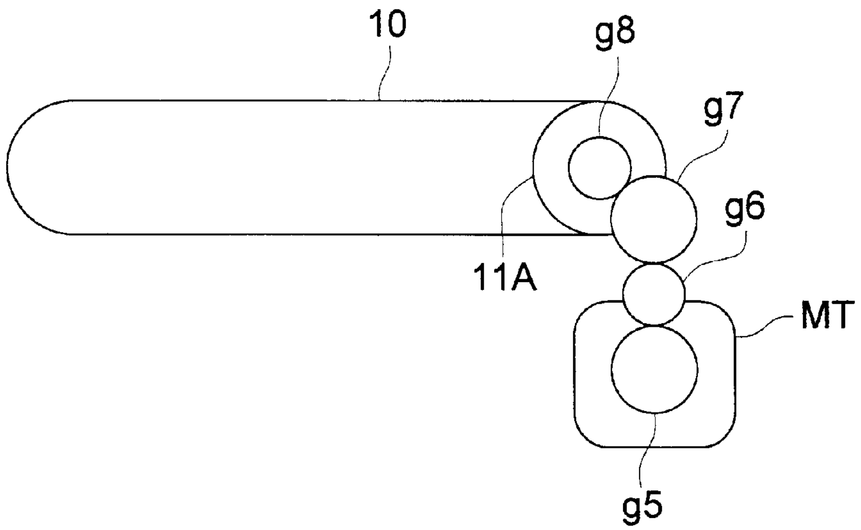

FIG. 3 shows a drive system of the photoreceptor and intermediate transfer element. The photoreceptor 2 commonly showing the photoreceptors 2Y, 2M, 2C and 2K, is driven by a photoreceptor drive motor MP which is commonly showing photoreceptor drive motors in the same manner, through gears g1–g4. The intermediate transfer element 10 is driven by an intermediate transfer element drive motor MT through gears g5–g8.

Figure 4:
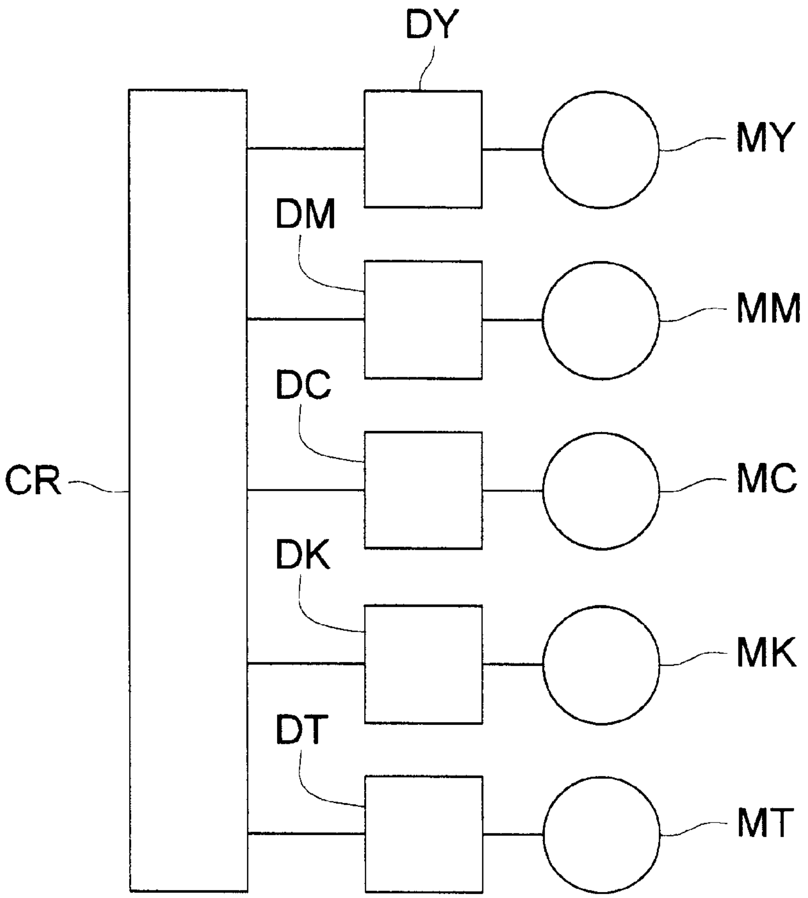
FIG. 4 is a block diagram of a control system of the color image forming apparatus according to the embodiment of the present invention.

FIG. 4 is a block diagram of the control system of the color image forming apparatus according to the embodiment of the present invention.

A photoreceptor drive motor MY to drive the photoreceptor 2Y, photoreceptor drive motor MM to drive the photoreceptor 2M, photoreceptor drive motor MC to drive the photoreceptor 2C, photoreceptor drive motor MK to drive the photoreceptor 2K, and intermediate transfer element drive motor MT to drive the intermediate transfer element 10, are driven by respective drive circuits DY, DM, DC, DK, and DT, and these drive circuits individually connected to a control means CR composed by a microcomputer by control lines. For photoreceptor drive motors MY, MM, MC, MK, and the intermediate transfer element drive motor MT, a stepping motor or DC motor can be used.

The photoreceptors 2Y, 2M, 2C, and 2K are in contact with the intermediate transfer element 10 as shown in FIG. 2, and these photoreceptors 2Y, 2M, 2C, and 2K and the intermediate transfer element 10 are driven so that they are moved at the same steady state peripheral speed. Further, at the time of start and at the time of stop, the synchronous control to almost simultaneously start and stop them is conducted on the photoreceptors 2Y, 2M, 2C, and 2K and the intermediate transfer element 10.

Figure 1:
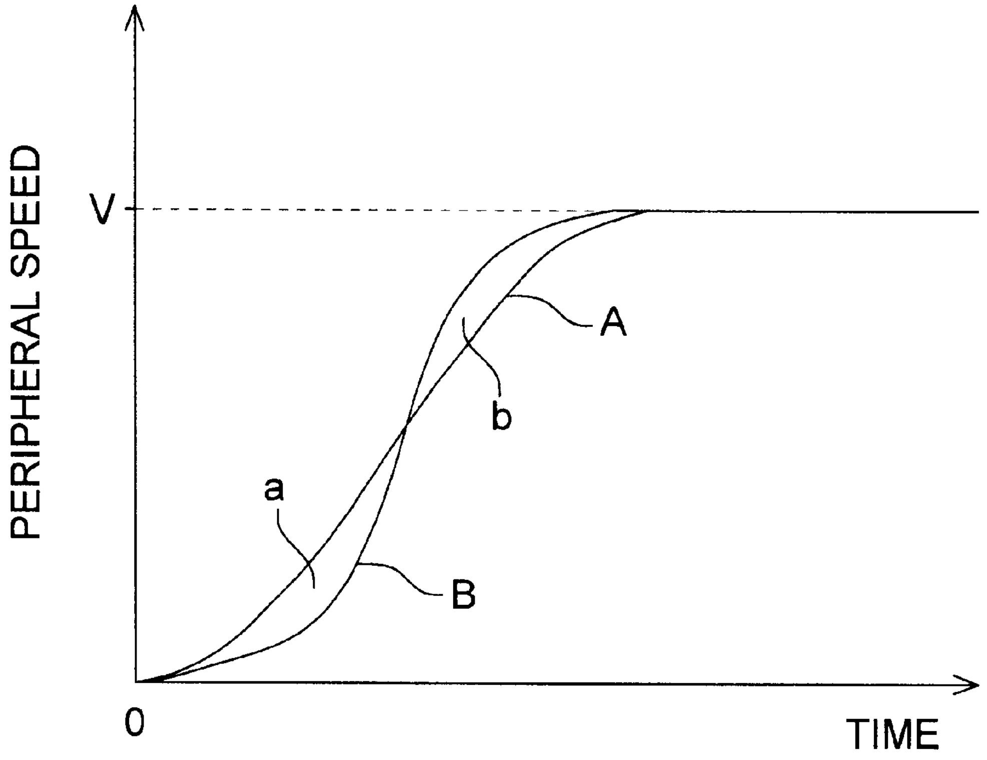
FIG. 1 is a view showing rise characteristics of an image forming element and an intermediate transfer element.

The reversal phenomenon of the peripheral speed of the photoreceptor and the intermediate transfer element at the start time shown in FIG. 1 or the phenomenon that the large speed difference is generated, is generated because only the on/off time of the photoreceptor and the intermediate transfer element is synchronized, and the speed control corresponding to the characteristics at the rise time of both is not independently conducted on both of them.

In the present embodiment, when the photoreceptor drive motors MY, MM, MC, MK, to drive the photoreceptor 2 and the intermediate transfer element drive motor MT to drive the intermediate transfer element 10 are controlled by a method by which they can be controlled independently, as described below, the undesirable phenomenon generated in the reversal phenomenon of the speed at the start time shown in FIG. 1, is surely prevented. Such the undesirable phenomenon as described above, is generated not only at the rise time but also at the steady state operation time to be operated at the steady state speed, and the stop time, however, these undesirable phenomena are surely prevented by the present embodiment.

Particularly, because the intermediate transfer element 10 is in contact with 4 photoreceptors 2Y, 2M, 2C and 2K, when the peripheral speed of the intermediate transfer element 10 is higher than the peripheral speed of the photoreceptors 2Y, 2M, 2C and 2K, the very large reduction torque is loaded on the intermediate transfer element drive motor MT. In the present embodiment, such the excessive load loaded on the intermediate transfer element drive motor is surely prevented.

In the present embodiment, specifically, by the following 2 methods, the generation of the excessive load is prevented. In this connection, in the following description, the description is made in such a manner that the photoreceptors 2Y, 2M, 2C and 2K are defined as the photoreceptor 2, and the photoreceptor drive motors MY, MM, MC, and MK are defined as the MP. The content described in the following, is applied for the respective of the photoreceptors 2Y, 2M, 2C and 2K, and the photoreceptor drive motors MY, MM, MC, and MK.

(1) The peripheral speed of the photoreceptor and the peripheral speed of the intermediate transfer element make the same.

FIG. 5(*a*) shows the speed changes of the both when the peripheral speed of the photoreceptor 2 and the intermediate transfer element 10 is made the same. In FIG. 5(*a*), Lab shows the peripheral speed of the photoreceptor 2 and the peripheral speed of the intermediate transfer element 10. As shown by the drawing, the peripheral speed of both is the same as shown by the Lab, in the rise time to the time t1 at which the peripheral speed of both reaches from the start time t0 to the steady state speed V, and in the steady state operation time after the time t1.

The control by which the speed becomes the peripheral speed shown in FIG. 5(*a*), is conducted when the photoreceptor drive motor MP and the intermediate transfer element drive motor MT are controlled by the control means CR.

Next, an example of the control when a stepping motor is used as the photoreceptor drive motor MP and the intermediate transfer element drive motor MT, will be described.

When parameters shown in Table 1 are used,

TABLE 1

| | |
|---|---|
| N | Number of steps of photoreceptor drive motor MP up to the time when photoreceptor 2 reaches the final speed. |
| B | Number of steps of intermediate transfer element drive motor MT up to the time when intermediate transfer element 10 reaches the final speed. |
| R1 | Diameter of photoreceptor 2 |
| R2 | Diameter of drive roller 11A to drive the intermediate transfer element 10. |
| G1 | Gear ratio of drive system to drive the photoreceptor 2. |
| G2 | Gear ratio of drive system to drive the intermediate transfer element 10. |
| Vs | Initial peripheral speed. |
| Ve | Final peripheral speed. |

The number of steps at the rise time of the photoreceptor drive motor MP, the number B of steps at the rise time of the intermediate transfer element drive motor MT, peripheral speed V1 (n) of the photoreceptor 2, peripheral speed V2 (m) of the intermediate transfer element 10, and the movement distance D1 at the rise time of the photoreceptor 2 and the movement distance D2 at the rise time of the intermediate transfer element 10, are expressed by the following expressions (1) to (6).

(1) The number of steps of the photoreceptor drive motor MP=N.

[Expression 1]

(2) The number of steps of the intermediate transfer element drive motor MT.

$$B = \frac{R2\pi \times G2}{R1\pi \times G1} \times N \qquad \text{[Expression 2]}$$

(3) The photoreceptor peripheral speed $$V1(n) = Vs + \frac{Ve - Vs}{N} \times n \quad n = 1, 2, 3 \ldots \qquad \text{[Expression 3]}$$

(4) The intermediate transfer element peripheral speed $$V2(m) = Vs + \frac{Ve - Vs}{B} \times m \quad m = 1, 2, 3 \ldots \qquad \text{[Expression 4]}$$

(5) The movement distance of the photoreceptor $$D1 = \int_{n=0}^{N} \left( Vs + \frac{Ve - Vs}{N} \times n \right) dn \qquad \text{[Expression 5]}$$

(6) The movement distance of the intermediate transfer element $$D2 = \int_{m=0}^{B} \left( Vs + \frac{Ve - Vs}{B} \times m \right) dm$$

In the example of the present embodiment, the photoreceptor drive motor MP and the intermediate transfer element drive motor MT are controlled so that the photoreceptor peripheral speed V1 (n)=the intermediate transfer element peripheral speed V2 (m), and the photoreceptor movement distance D1=the intermediate transfer element movement distance D2 are satisfied. For the condition that the photoreceptor peripheral speed and the intermediate transfer element peripheral speed are made the same, the control to maintain the above condition throughout the rise time and the steady state operation time of them is conducted.

Such the control is attained when the control of the control pulse frequency by the divider which the control means CR has, is independently conducted of the photoreceptor drive motor MP and the intermediate transfer element drive motor MT. By the control shown in FIG. 5(*a*), it can be prevented that the excessive load due to the drive system of the photoreceptor 2 is loaded onto the intermediate transfer element drive motor MT.

(2) The peripheral speed of the intermediate transfer element is made lower than the peripheral speed of the photoreceptor by a predetermined value.

In another example of the present embodiment, the control that the difference between the photoreceptor peripheral speed V1 (n) and the intermediate transfer element peripheral speed V2 (m), that is, the difference ΔV shown by the following expression (7) becomes a predetermined value K, is conducted. Such the control is also attained when the control pulse of the photoreceptor drive motor MP and the intermediate transfer element drive motor MT is independently controlled.

[Expression 6]

(7) The difference between peripheral speed V1and peripheral speed V2

$$\Delta V = \frac{Ve - Vs}{N} \times n - \frac{Ve - Vs}{B} \times m = K$$

The control according to the expression (7) is shown in FIG. 5(*b*). As shown in FIG. 5(*b*), the peripheral speed Lb of the intermediate transfer element 10 is always lower than the peripheral speed Lb of the photoreceptor 2 by a predetermined value K at the rise time of t0–t1 and at the steady state operation time after t1. As the predetermined value K, a minute value of about 0.2–0.5% of the speed V1or V2 is preferable.

As described above, the control that the intermediate transfer element peripheral speed is made lower than the photoreceptor peripheral speed by a predetermined value is conducted throughout at the rise time and the steady state operation time of the intermediate transfer element 10 and the photoreceptor 2.

By the control satisfying the condition shown by the expression (7), it can be avoided that the load of the drive system of the photoreceptor 2 becomes a load torque of the intermediate transfer element drive motor MT.

In the present embodiment, at the time of completion of an image forming process, that is, at the stop time of the photoreceptor 2 and the intermediate transfer element 10, the control so that an excessive load is not burdened on the intermediate transfer element, is conducted. Specifically, the control that the timing at which the control means CR turns off the intermediate transfer element drive motor MT, is made slightly earlier than the timing at which the control means CR turns off the photoreceptor drive motor MP, is conducted. By this control, the excessive lord burdened on the intermediate transfer element drive motor MT is eliminated.

According to the present invention, the following effects can be obtained.

(1) Because the photoreceptor and intermediate transfer element can be independently controlled, the control corresponding to the rise characteristic or fall characteristic at the start time, steady state operation or stop time of them can be conducted, and it is prevented that the excessive load torque is burdened on the image forming element drive motor or intermediate transfer element drive motor. As the result, the motors having the necessary minimum power as these motors can be used, and the electric power consumption can be reduced, and the cost reduction and consumption energy reduction can be realized. In a color image forming apparatus using a plurality of image forming elements and intermediate transfer element, all the load of the drive systems of the image forming elements are burdened on the intermediate transfer element drive motor, and there is a case where the load torque of the intermediate transfer element drive motor is increased, however, according to the present invention, in the color image forming apparatus, the excessive load burdened on the intermediate transfer element can be surely avoided, and the cost reduction and energy consumption reduction can be surely realized.

(2) Because the peripheral speed of the photoreceptor and the peripheral speed of the intermediate transfer element are controlled so that they become the same, the excessive load burdened on the intermediate transfer element drive motor at the rise time can be very finely removed.

(3) Because the peripheral speed of the photoreceptor and the peripheral speed of the intermediate transfer element are controlled so that they become the same, the excessive load burdened on the intermediate transfer element drive motor at the steady state operation time can be very finely removed.

(4) Because the movement distance of the photoreceptor and the movement distance of the intermediate transfer element are controlled so that they become the same, the excessive load burdened on the intermediate transfer element drive motor at the rise time can be very finely removed.

(5) The excessive load burdened on the intermediate transfer element drive motor at the stop time can be very finely removed.

(6) Because the control is conducted so that the peripheral speed of the intermediate transfer element does not always exceed the peripheral speed of the photoreceptor, the excessive load burdened on the intermediate transfer element at the rise time can be very finely removed.

(7) Because the control is conducted so that the peripheral speed of the intermediate transfer element does not always exceed the peripheral speed of the photoreceptor, the excessive load burdened on the intermediate transfer element at the steady state operation time can be very finely removed.

(8) The excessive load burdened on the intermediate transfer element drive motor at the stop time is eliminated, and the load burdened on the intermediate transfer element drive motor is decreased.

Disclosed embodiment can be varied by a skilled person without departing from the spirit and scope of the invention.

What is claimed is:

1. An image-forming apparatus, comprising:

a plurality of image-forming elements;

a plurality of first driving motors, respectively corresponding to said image-forming elements, to drive said plurality of image-forming elements;

an intermediate transfer element that is disposed opposite said plurality of image-forming elements;

a second driving motor to drive said intermediate transfer element; and a controlling section to control said plurality of first driving motors and said second driving motor independently of each other;

wherein said controlling section controls said plurality of first driving motors so as to unify peripheral speeds of said plurality of image-forming elements at a first peripheral speed; and wherein said controlling section controls at least one of said plurality of first driving motors and said second driving motor so that a second peripheral speed of said intermediate transfer element coincides with said first peripheral speed during a transition period in which said first peripheral speed changes from a certain peripheral speed to another peripheral speed.

2. The image-forming apparatus of claim 1, wherein said transition period is a start-up transition period in which said first peripheral speed increases from zero to a predetermined peripheral speed.

3. The image-forming apparatus of claim 1, wherein said controlling section controls both said plurality of first driving motors and said second driving motor so that both said first peripheral speed and said second peripheral speed coincide with a predetermined peripheral speed during a steady-state operating time.

4. The image-forming apparatus of claim 1, wherein said controlling section controls at least one of said plurality of first driving motors and said second driving motor so that each of moved peripheral-distances of said plurality of image-forming elements coincides with that of said intermediate transfer element during said transition period.

5. The image-forming apparatus of claim 1, wherein, when stopping said plurality of first driving motors and said second driving motor, said controlling section turns off said second driving motor before turning off said plurality of first driving motors.

6. The image-forming apparatus of claim 1, wherein each of said plurality of first driving motors and said second driving motor comprises one of a stepping motor and a DC motor.

7. An image-forming apparatus, comprising:

a plurality of image-forming elements;

a plurality of first driving motors, respectively corresponding to said image-forming elements, to drive said plurality of image-forming elements;

an intermediate transfer element that is disposed opposite said plurality of image-forming elements;

a second driving motor to drive said intermediate transfer element; and a controlling section to control said plurality of first driving motors and said second driving motor independently of each other;

wherein said controlling section controls said plurality of first driving motors so as to unify peripheral speeds of said plurality of image-forming elements at a first peripheral speed; and wherein said controlling section controls at least one of said plurality of first driving motors and said second driving motor so that a second peripheral speed of said intermediate transfer element is different from said first peripheral speed during a transition period in which said first peripheral speed changes from a certain peripheral speed to another peripheral speed.

8. The image-forming apparatus of claim 7, wherein said transition period is a start-up transition period in which said first peripheral speed increases from zero to a predetermined peripheral speed.

9. The image-forming apparatus of claim 7, wherein said controlling section controls both said plurality of first driving motors and said second driving motor so that both said first peripheral speed and said second peripheral speed coincide with a predetermined peripheral speed during a steady-state operating time.

10. The image-forming apparatus of claim 7, wherein, when stopping said plurality of first driving motors and said second driving motor, said controlling section turns off said second driving motor before turning off said plurality of first driving motors.

11. The image-forming apparatus of claim 7, wherein each of said plurality of first driving motors and said second driving motor comprises one of a stepping motor and a DC motor.

12. A method for controlling motors equipped in an image-forming apparatus, which includes a plurality of image-forming elements, a plurality of first driving motors to drive said plurality of image-forming elements, an intermediate transfer element disposed opposite said plurality of image-forming elements, and a second driving motor to drive said intermediate transfer element, said method comprising controlling said plurality of first driving motors so as to unify peripheral speeds of said plurality of image-forming elements at a first peripheral speed; and controlling at least one of said plurality of first driving motors and said second driving motor so that a second peripheral speed of said intermediate transfer element coincides with said first peripheral speed during a transition period in which said first peripheral speed changes from a certain peripheral speed to another peripheral speed.

13. The method of claim 12, wherein said transition period is a start-up transition period in which said first peripheral speed increases from zero to a predetermined peripheral speed.

14. The method of claim 12, further comprising:

controlling both said plurality of first driving motors and said second driving motor so that both said first peripheral speed and said second peripheral speed coincide with a predetermined peripheral speed during a steady-state operating time.

15. The method of claim 12, further comprising:

controlling at least one of said plurality of first driving motors and said second driving motor so that each of moved peripheral-distances of said plurality of image-forming elements coincides with that of said intermediate transfer element during said transition period.

16. The method of claim 12, further comprising:

turning off said second driving motor before turning off said plurality of first driving motors, when stopping said plurality of first driving motors and said second driving motor.

17. The method of claim 12, wherein each of said plurality of first driving motors and said second driving motor comprises one of a stepping motor and a DC motor.

18. A method for controlling motors equipped in an image-forming apparatus, which includes a plurality of image-forming elements, a plurality of first driving motors to drive said plurality of image-forming elements, an intermediate transfer element disposed opposite said plurality of image-forming elements, and a second driving motor to drive said intermediate transfer element, said method comprising:

controlling said plurality of first driving motors so as to unify peripheral speeds of said plurality of image-forming elements at a first peripheral speed; and controlling at least one of said plurality of first driving motors and said second driving motor so that a second peripheral speed of said intermediate transfer element is different from said first peripheral speed during a transition period in which said first peripheral speed changes from a certain peripheral speed to another peripheral speed.

19. The method of claim 18, wherein said transition period is a start-up transition period in which said first peripheral speed increases from zero to a predetermined peripheral speed.

20. The method of claim 18, further comprising:

controlling both said plurality of first driving motors and said second driving motor so that both said first peripheral speed and said second peripheral speed coincide with a predetermined peripheral speed during a steady-state operating time.

21. The method of claim 18, further comprising:

turning off said second driving motor before turning off said plurality of first driving motors, when stopping said plurality of first driving motors and said second driving motor.

22. The method of claim 18, wherein each of said plurality of first driving motors and said second driving motor comprises one of a stepping motor and a DC motor.

* * * * *